Figure 1:
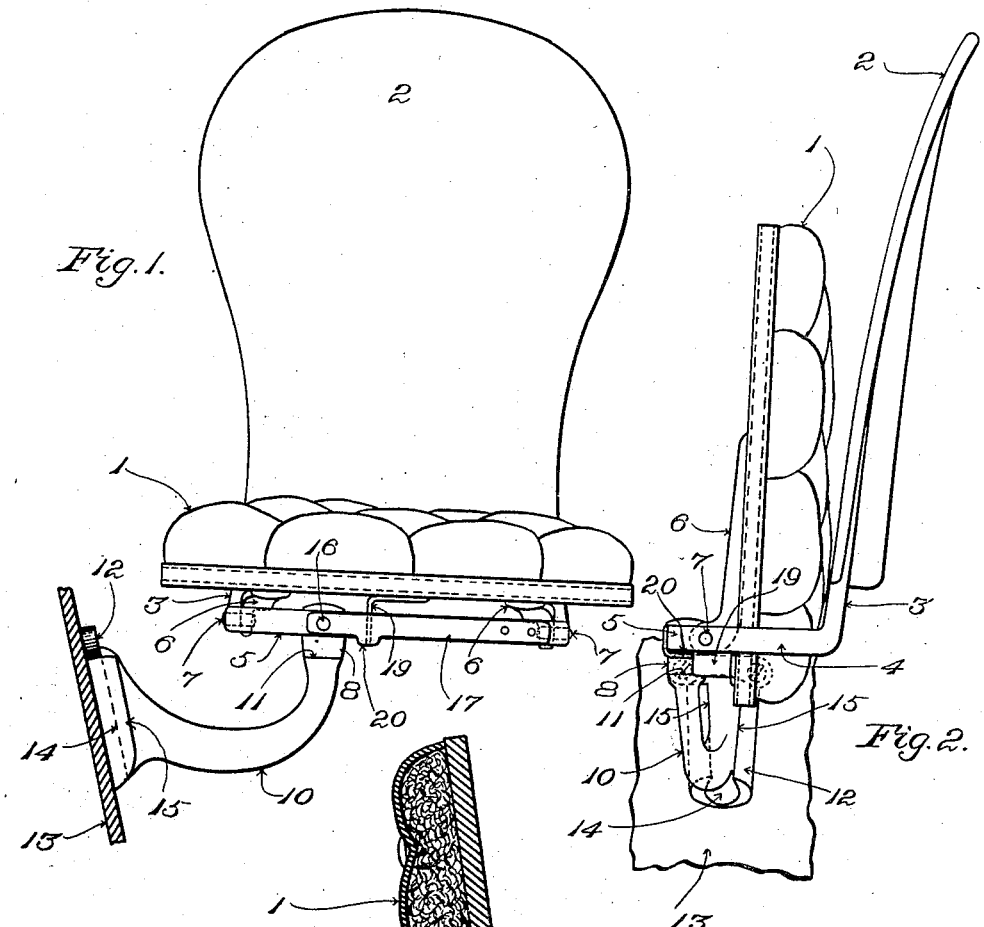

J. BENSON.
VEHICLE SEAT.
APPLICATION FILED DEC. 12, 1908.

936,513.

Patented Oct. 12, 1909.

Witnesses:
Oscar F. Hill
Edith J. Anderson

Inventor:
Judson Benson
By Chas. F. Randall
Attorney.

UNITED STATES PATENT OFFICE.

JUDSON BENSON, OF AMESBURY, MASSACHUSETTS.

VEHICLE-SEAT.

936,513.  Specification of Letters Patent.  Patented Oct. 12, 1909.

Application filed December 12, 1908. Serial No. 467,145.

*To all whom it may concern:*

Be it known that I, JUDSON BENSON, a citizen of the United States, residing at Amesbury, in the county of Essex, State of Massachusetts, have invented a certain new and useful Improvement in Vehicle-Seats, of which the following is a specification, reference being had therein to the accompanying drawings.

The invention is applicable to seats of the kind now used extensively as auxiliary seats in automobiles, and which are mounted with capacity to swing or turn horizontally upon their supports.

It consists in novel locking devices combined with a seat of such kind, for holding it from swinging out of its position for use. The said devices are constructed to automatically lock the seat in the said position as it reaches the latter in being turned forward from a retracted position, and they include an unlocking device which unlocks the seat when the seat-proper, after being swung on its hinges into an upright position, is pressed backward. When unlocked the seat is free to be turned around upon its support, and if desired may be turned into the retracted position.

The invention is not necessarily restricted to use in automobiles, nor to use in vehicles, although for convenience of explanation I herein describe the same with reference to its employment in an automobile.

An embodiment of the invention is shown in the drawings, in which latter,—

Figure 2:
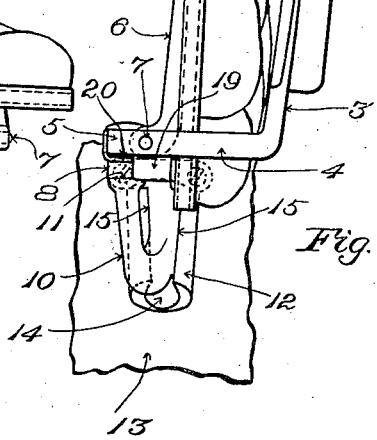
Figures 3, 4:
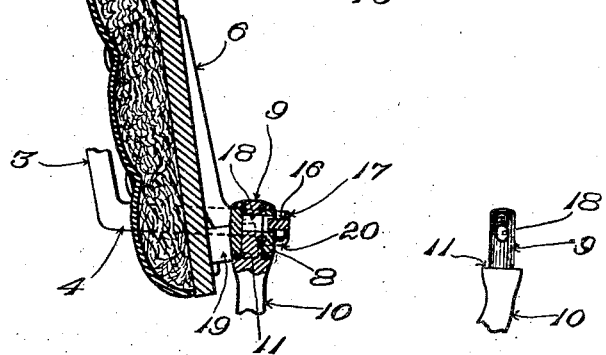

Figure 1 is a front elevation of a seat involving my invention in position for use, showing its supporting-arm and a portion of a side of an automobile. Fig. 2 is an elevation looking from the right in Fig. 1 with the seat-proper raised in an upright position. Fig. 3 is a sectional view, looking from the left in Fig. 1, with the seat-proper pressed farther back than in Fig. 2, and the locking devices thereby unlocked. Fig. 4 is a detail view of the vertical pivotal stud.

Having reference to the drawings,—the invention is shown applied in connection with a seat of well-known character comprising the seat-proper 1 and the back 2, the latter having an iron frame 3, the side-portions of which extend below the upholstered part of the back and are united with rearwardly-extending end-portions 4, 4, of a cross-bar 5. The seat-proper is shown hung as usual to the cross-bar by means of metal straps 6, 6, which are fastened to the under side of the seat-proper, these straps being in pivotal connection at 7, 7, with the said end-portions so that the seat-proper may be raised from its usual horizontal position and swung into an upright position in front of the back 2. The cross-bar 5 is provided, as heretofore, with a bearing or socket 8 fitting a vertical stud 9 upon a supporting-arm 10, and the lower end thereof resting upon a shoulder 11 of the supporting-arm at the base of the stud, whereby the cross-bar and seat are supported vertically upon the supporting-arm, and are permitted to turn horizontally around the stud. The supporting-arm is shown removably applied to a stand 12 upon a support 13, which last may be the side of an automobile, removable engagement of the supporting-arm with the stand being provided for by means of a tapered base-portion 14 with which the said arm is furnished, and a correspondingly tapered socket between the side-walls or flanges 15, 15, of the stand. By passing the base 14 downward into the socket of the stand, the supporting-arm is connected with the stand so as to be supported thereby. By raising the base out from the socket, the supporting-arm is disconnected from the stand.

In the drawings, the hinges by which the seat-proper is hinged to the horizontal bar or carrier 5 are located at or near the back edge of such seat, the seat-proper having capacity to be swung upon the hinges into an upright position when desired, and as described above the said bar is mounted upon the supporting-arm 10 with capacity to turn horizontally about an upright pivotal axis. It will be observed that the pivotal stud 9 is located nearer one end of the bar than the other thereof. When such a seat occupies its intended position for use the bar 5 thereof extends at right angles from the side of the automobile, and the back portions of the seat are well forward out of the way of the occupants of the usual fixed seats. When, however, the seat is unprovided with locking devices for securing it in such position, it is liable to move with its occupant, and it may turn around so that its outer portions will strike against the knees of the occupants of the said fixed seats, or otherwise interfere with their comfort and convenience. The turning of the seat with the person sitting upon it, as a result of the stopping and starting of the vehicle, or swaying and changes of speed and direction, is disagreeable and liable to unseat or injure him.

My devices for locking the seat in its position for use, so as to prevent it from swinging or turning around horizontally therefrom, comprise a movable pin 16 working within a hole made through the wall of the bearing or socket 8 of the cross-bar, an actuating spring 17 for the said pin, and a recess 18 in the stud 9. Spring 17 is in this instance a leaf-spring which lies alongside the cross-bar and is attached thereto by one end, its other end having the locking-pin attached thereto. The spring presses the locking-pin inwardly, so that when the seat is turned around to the position for use, and the locking-pin and recess are thereby presented opposite each other, the pin is caused to enter the recess. While the pin continues to occupy the recess, the engagement of the inner end of the pin with the walls of the recess prevents turning movement of the seat in a horizontal direction.

To enable the locking pin to be automatically withdrawn from the recess 18 so as to unlock the seat, by the act of pressing the upturned seat over toward the back 2, a projecting piece 19 is provided in connection with the seat, the said piece being arranged at the rear of the points at which the seat is hinged to the cross-bar. As the seat is turned upward upon the said hinges, this projecting piece approaches a rearwardly-projecting portion 20 of the spring. The relations of the parts are such as to permit the seat to be turned fully upward and a little back of an upright position before the piece 19 engages with the portion 20 of the spring. This enables the seat to assume the upright position, and to retain such position, while still remaining locked against turning horizontally. Continued movement of the upturned seat on its hinges, causing it to approach closer to the back 2, will cause the projecting piece 19 carried by the seat-proper to act upon the projecting portion 20 of the spring, so as to bend the spring and disengage the locking pin from the recess 18 in the pivotal stud. The seat may then be turned around horizontally upon the said stud so as to dispose the upturned seat flatwise with relation to the side of the automobile.

I claim as my invention:—

1. The combination with a seat, a bar or carrier to which the seat-proper is hinged with capacity to be swung vertically, and a support on which the said bar or carrier is mounted with capacity to be turned horizontally, of a spring-actuated locking-device acting normally to lock the seat from turning horizontally out of position for use, and a projection carried by the seat-proper and caused by the upward swinging movement of the latter to positively disengage the said locking-device so as to render the seat free to turn horizontally.

2. The combination with a seat, a bar or carrier to which the seat-proper is hinged with capacity to be swung vertically, and a support on which the said bar or carrier is mounted with capacity to be turned horizontally, of a locking-pin adapted to engage said support to lock the seat from turning horizontally out of position for use, an actuating spring for such pin, and a projection moving with the seat-proper and adapted in the swinging movement of the latter to act upon the spring to disengage the pin so as to render the seat free to turn horizontally.

In testimony whereof I affix my signature in presence of two witnesses.

JUDSON BENSON.

Witnesses:
WARREN E. FULLER,
CLARENCE B. JONES.